April 28, 1953  H. NUTT  2,636,363
VIBRATION DAMPENER
Filed Dec. 30, 1948
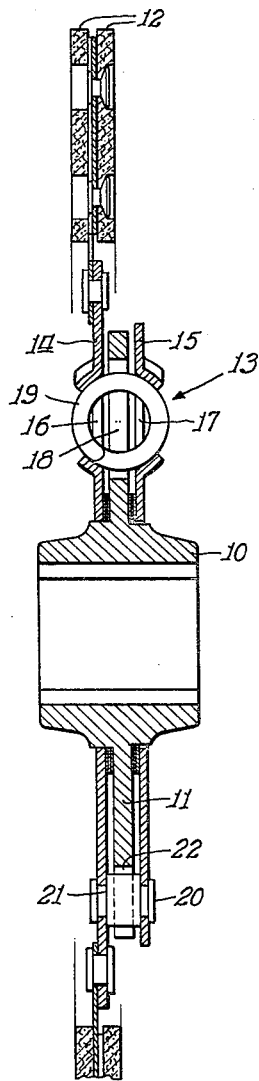
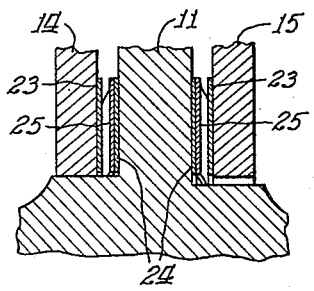
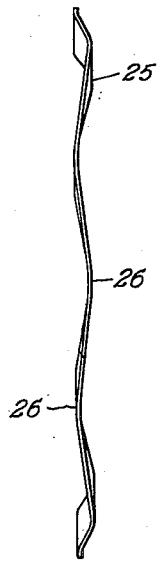
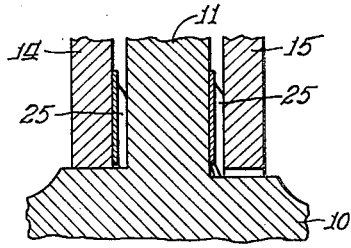
Inventor
Harold Nutt Patented Apr. 28, 1953

2,636,363

UNITED STATES PATENT OFFICE 2,636,363

VIBRATION DAMPENER

Harold Nutt, Chicago, Ill., assignor to Borg-Warner Corporation, Chicago, Ill., a corporation of Illinois Application December 30, 1948, Serial No. 68,160

2 Claims. (Cl. 64—27)

1

The present invention relates to driven plates for friction clutch assemblies. The improvements are more particularly directed to the provision of novel braking means having cooperative association with the torsional vibration dampener of a clutch plate, such braking means being located preferably between the hub flange and the disc-like side plates which are carried by the hub alongside said flange for supporting friction facing material at the outer region of the clutch plate.

One of the principal objects of the invention contemplated herein is to improve the efficiency and operation of a clutch driven plate having a torsional vibration dampener.

Heretofore it has been the practice to tie together the disc-like plates on the sides of the hub flange by means of rivets or spacers and to insert a plurality of flat washers between the hub flange and each plate. Pressure is usually created on these washers due to the springing or distorting of the side plates by reason of the fact that the outer regions of said plates are drawn toward each other when the rivets are upset. The thickness of these washers are usually varied to secure the desired amount of braking pressure and said washers are selected for the desired braking action needed in a particular clutch plate. This arrangement, while being effective, is expensive to manufacture as compared with the production costs of the present arrangement which has proven satisfactory under severe use and in engineering laboratory tests. With the present improvements, unnecessary springing or distorting of the disc-like plates is not necessary to secure desired braking action, but on the contrary, such braking is effectively obtained by means of an undulated annular spring member having oppositely projecting portions to engage respectively the flange and an adjacent plate to hold these parts separated at the hub region of the flange, or alternatively, said spring means may be interposed between a pair of washers which are in contact respectively with the flange and a side plate.

It is another principal object of the present invention to provide a simplified but effective structure for creating braking pressure, said braking means being cooperatively associated with the usual torsional vibration dampener of a clutch driven plate.

Other objects, aims, and advantages of the invention contemplated herein will be apparent to persons skilled in the art after understanding the construction and operation of the arrangement

2 disclosed herein. Reference is now made to the accompanying drawings which form a part of this specification.

In the drawings:

Fig. 1 is a sectional view of a friction clutch driven plate, the view being taken diametrically through the plate showing the present improvements incorporated therein;

Fig. 2 is an enlarged fragmental view of the hub region shown in Fig. 1;

Fig. 3 is an edge elevation showing the spring washer member for exerting braking action in conjunction with the torsional vibration dampener of the clutch driven plate; and Fig. 4 is a fragmental view similar to Fig. 2, showing a modified arrangement of the braking means.

The drawings are to be understood as being more or less of a diagrammatic character for the purpose of disclosing typical or preferred forms of the invention, and in these drawings the same reference characters are used to identify like parts in the different views.

By way of example, the form of the invention disclosed herein comprises a clutch plate of a conventional design and includes a hub member 10 having a radially extending flange 11. The spaced friction facings 12 of annular form are connected to the hub by a vibration dampener assembly indicated generally as 13, which assembly comprises a pair of disc-like plates 14 and 15, the plate 14 being of greater diameter than the other plate to provide a mounting disc which carries the friction facing members. As seen in Fig. 1, both plates are of greater diameter than the hub flange 11 to extend beyond the outer periphery of such flange.

Registering openings 16, 17 and 18 are made respectively in the plates 14 and 15 and the hub flange 11 to receive a plurality of coiled springs 19, the ends of such springs abutting the radial end walls of the respective openings and together forming a sectional spring cushion between the hub and the plates and also providing a driving connection between the hub and said plates. As best seen in Fig. 1, the plates are tied together by rivets 20 having shoulders 21. By reason of this arrangement, the two plates 14 and 15 move in unison with the hub. The shank portions of the rivets 21 are positioned in outwardly opening recesses or notches 22 made in the outer periphery of the hub flange. This permits the plates to have limited rotative movement relative to the hub and its flange, thereby cushioning the plate with respect to the hub under sudden engagement of the clutch and also tending to dampen out vibrations which may be transmitted from the motor to the clutch plate.

The inner regions of the disc-like plates 14 and 15 are arranged close to, or they may rest on, the hub surface and they are spaced axially from the hub flange, and braking means are interposed between the hub flange and the adjacent inner surfaces of said disc-like plates. In one form of the invention the braking means may comprise a pair of spacer washers 23 and 24 arranged one pair on each side of the hub flange. The washers 23 and 24 comprising each pair are spaced from each other and are maintained in this relationship by an undulated spring washer or ring 25 which is shown in detail in Fig. 3. This ring 25 is preferably made of spring sheet metal which is preformed in the direction of the thickness of the metal to provide a plurality of oppositely extending crown regions 26 contacting the opposing faces of the spacer washers 23 and 24 between which the spring ring is interposed. Thus it is apparent that this ring is of an undulated or wavy character. These spring rings are adapted to be placed under tension when the disc-like plates 14 and 15 are tied together by the rivets 20 and such tension is sufficient to urge the spacer washers 23 and 24 in opposite directions for frictionally engaging the adjacent surface of the hub flange and the respective disc-like plates 14 and 15.

In the form of the invention shown in Fig. 4, the spacer washers 23 and 24 are omitted and the undulated spring rings 25 each act directly against the hub flange and the adjacent surfaces of the respective plates 14 and 15.

While this invention has been described in detail in its preferred forms or embodiments, it will be apparent to persons skilled in the art, after understanding the improvements, that various changes and modifications may be made therein without departing from the spirit and scope thereof. It is aimed in the appended claims to cover all such changes and modifications.

What is claimed is:

1. A friction clutch driven plate comprising a hub, and a radial flange thereon; a facing assembly including an annular supporting plate alongside said flange and having an inner region close to said hub and spaced axially from the inner end of said flange; said plate being connected to said hub flange for rotation therewith and for independent rotative movement relative thereto; stop means defining the limits of said rotative relative movement between said plate and hub; and a plurality of thin sheet metal friction washers of narrow transverse dimensions arranged in frictional contacting relation to each other and also the hub region of said flange and the adjacent inner region of said supporting plate and yieldably spacing said plate axially from said flange, one of said washers intermediate two other washers being characterized by having therein a plurality of circumferentially spaced undulations extending in axial directions toward and contacting the next adjacent washers thereby exerting frictional braking acting in an axial direction against said adjacent washers and also against the inner regions of said hub flange and hub plate thereby constantly yieldably resisting the aforesaid independent rotative movement of said supporting plate with respect to said hub and flange.

2. A friction clutch driven plate comprising a hub, and a radial flange thereon; a facing assembly including an annular supporting plate and a secondary plate arranged one at each side of said flange and connected to each other for simultaneous movement, each plate having an inner region close to said hub and spaced axially from the inner end of said flange; means connecting said plates to said hub flange for rotation therewith and for independent rotative movement relative thereto; stop means defining the limits of said rotative relative movement between the respective plates and said hub flange; and a plurality of thin sheet metal friction washers of narrow transverse dimensions arranged in frictional contacting relation to each other on each side of the hub region of said flange and next the adjacent inner regions of the respective plates, and yieldably spacing the inner peripheries of said plates axially from said flange, one of the washers on each side of said flange and intermediate two other washers of the same side of said flange being characterized by having therein a plurality of circumferentially spaced offset regions extending in opposite axial directions toward and contacting the next adjacent washers at each side of said flange, the offset regions of said intermediate washers exerting frictional braking action in an axial direction against the washers adjacent thereto and also against the opposite surfaces of the inner region of said hub flange and thereby constantly yieldably resisting the aforesaid independent rotative movement of both said supporting plate and said secondary plate with respect to said hub and flange.

HAROLD NUTT.

References Cited in the file of this patent

UNITED STATES PATENTS

| Number | Name | Date |
|---|---|---|
| 1,340,885 | Fuller | May 25, 1920 |
| 1,726,825 | Hawkins | Sept. 3, 1929 |
| 2,097,627 | Lewis | Nov. 2, 1937 |
| 2,277,558 | Nutt | Mar. 24, 1942 |
| 2,284,349 | Thelander | May 26, 1942 |
| 2,314,948 | Nutt | Mar. 30, 1943 |
| 2,318,620 | Nutt | May 11, 1943 |

FOREIGN PATENTS

| Number | Country | Date |
|---|---|---|
| 209,916 | Great Britain | 1924 |